United States Patent
Rochberger

(10) Patent No.: US 6,470,022 B1
(45) Date of Patent: Oct. 22, 2002

(54) METHOD OF DISTRIBUTING NETWORK RESOURCES FAIRLY BETWEEN USERS IN AN ASYNCHRONOUS TRANSFER MODE NETWORK

(75) Inventor: Haim Rochberger, Netanya (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/315,212

(22) Filed: May 19, 1999

(51) Int. Cl.[7] .............................. H04J 3/16; H04L 12/28
(52) U.S. Cl. ..................................... 370/437; 370/395.2
(58) Field of Search ............................. 370/238.1, 238, 370/229, 232, 235, 237, 389, 394, 392, 395.1, 396, 398, 395.21, 395.31, 395.32, 395.51, 395.52, 395.7, 395.53, 400, 431, 437, 901, 902, 903, 905; 359/120, 128

(56) References Cited

U.S. PATENT DOCUMENTS

| | | | | |
|---|---|---|---|---|
| 4,823,338 A | * | 4/1989 | Chan et al. .................... 370/85 |
| 4,975,906 A | | 12/1990 | Takiyasu et al. .......... 370/85.13 |
| 5,214,646 A | | 5/1993 | Yacoby .................... 370/85.14 |
| 5,280,476 A | | 1/1994 | Kojima et al. ............. 370/60.1 |
| 5,280,481 A | | 1/1994 | Chang et al. ............ 370/85.13 |
| 5,315,582 A | | 5/1994 | Morizono et al. ............ 370/16 |
| 5,321,693 A | | 6/1994 | Perlman .................. 370/85.13 |
| 5,321,694 A | | 6/1994 | Chang et al. ............ 370/85.13 |
| 5,329,527 A | | 7/1994 | Ujihashi et al. ......... 370/85.13 |
| 5,329,619 A | | 7/1994 | Page et al. ................... 395/200 |
| 5,345,558 A | | 9/1994 | Opher et al. ................ 395/200 |
| 5,390,184 A | | 2/1995 | Morris ...................... 370/94.2 |
| 5,394,402 A | * | 2/1995 | Ross ......................... 370/94.1 |
| 5,408,469 A | | 4/1995 | Opher et al. ............... 370/60.1 |
| 5,444,702 A | * | 8/1995 | Burnett et al. ............. 370/60.1 |
| 5,483,536 A | | 1/1996 | Gunji et al. ............. 370/85.14 |
| 5,519,704 A | | 5/1996 | Farinacci et al. ........ 370/85.13 |
| 5,548,646 A | * | 8/1996 | Aziz et al. .................... 380/23 |
| 5,548,723 A | | 8/1996 | Pettus .................... 395/200.01 |
| 5,550,816 A | * | 8/1996 | Hardwick et al. ............ 370/60 |
| 5,550,818 A | | 8/1996 | Brackett et al. .............. 370/60 |
| 5,566,014 A | | 10/1996 | Glance ........................ 359/124 |
| 5,583,865 A | * | 12/1996 | Esaki et al. ................. 370/397 |
| 5,600,644 A | | 2/1997 | Chang et al. ............... 370/404 |
| 5,633,869 A | * | 5/1997 | Burnett et al. .............. 370/396 |
| 5,659,542 A | * | 8/1997 | Bell et al. .................... 370/496 |
| 5,666,489 A | * | 9/1997 | Goodman et al. ..... 395/200.76 |
| 6,208,623 B1 | * | 3/2001 | Rochberger et al. |
| 6,272,107 B1 | * | 8/2001 | Rochberger et al. |
| 6,310,877 B1 | * | 10/2001 | Rochberger |

FOREIGN PATENT DOCUMENTS

| | | | | |
|---|---|---|---|---|
| WO | WO97/04386 | * | 2/1997 | ............ G06F/9/455 |
| WO | WO98/02821 | * | 1/1998 | ............ G06F/13/00 |

OTHER PUBLICATIONS

Ellington, B. (Ed.), LAN Emulation SWG Drafting Group, "LAN Emulation Over ATM Specification –Version 1.0", ATM Forum, pp. 1–139, (1995).

(List continued on next page.)

Primary Examiner—William Luther
(74) Attorney, Agent, or Firm—Howard Zaretsky

(57) ABSTRACT

A method of distributing network resources fairly in an ATM network that is applicable in situations where a large number of clients establish connections to a single server. The method provides a way to more evenly distribute network resources when large number of clients desire connections to a popular server. A fair percentage value is assigned to a popular server and advertised in a PTSE. The fair percentage value is associated with a reachable ATM destination address and is flooded throughout the network. When a source node desires to connect to this server, the route is chosen in accordance with the fair percentage value. Rather than always selecting the best route, the source node chooses a route at random from among a percentage of the best routes. The switches can be configured with the fair percentage value either statically via a network manager or dynamically under program control.

14 Claims, 5 Drawing Sheets

OTHER PUBLICATIONS

Novell NetWare Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA Part No. 100–001866–001, May 1993, pp. B–15–B–22.

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1998).

Doeringer, W. et al. "Routing on Longest–Matching Prefixes", *IEEE/ACM Transactions on Networking*, Vol. 4, No. 1, Feb. 1996, pp. 86–97.

Williams, K. A., "A Distributed ATM Network Based on an Optical Passive Star", Printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

Simpson, W., "IP in Ip Tunneling", Request for Comments #153, Oct. 1995, 9 pages.*

Swallow, G., "Frame Relay PVC Multicast Service and Protocol Description", FRF.7, Frame Relay Forum Implementation Agreement, Oct. 21, 1994, printed from internet site www.frforum.com, 17 pages.*

Cisco—"Packet Services", printed from website http://www.cisco.com/warp/public/732/Tech/pksrv_tc.html, 32 pages., Dec. 1995.*

Deering, S., "Host Extensions for IP Multicasting", Request for Comments (RFC) 1112, Stanford University, 16 pages., Aug. 1989.*

Egevang, K. et al., "The IP Network Address Translator (NAT)", Request for Comments (RFC) 1631, Cray Communications, 12 pgs., May 1994.*

"All About . . . Multicast Wide Area Network Services", printed from website http://www.starburstcom.com/mcast.html, 11 pages., Feb. 1997.*

* cited by examiner

METHOD OF DISTRIBUTING NETWORK RESOURCES FAIRLY BETWEEN USERS IN AN ASYNCHRONOUS TRANSFER MODE NETWORK

FIELD OF THE INVENTION

The present invention relates generally to data communications networks and more particularly relates to a method of distributing network resources fairly among users establishing calls in an ATM network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by the ATM Forum. The previous Phase 0 draft specification is referred to as Interim Inter-Switch Signaling Protocol (IISP). The goal of the PNNI specifications is to provide customers of ATM network equipment some level of multi-vendor interoperability.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well-known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical link becomes operational, the nodes attached to it initiate and exchange information via a well known Virtual Channel Connection (VCC) used as a PNNI Routing Control Channel (RCC).

Hello messages are sent periodically by each node on this link. In this fashion the Hello protocol makes the two neighboring nodes known to each other. Each node exchanges Hello packets with its immediate neighbors to determine the local state information of its neighbor. The state information comprises the identity and peer group membership of the immediate neighbors of the node including a status of all its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represents the present view of the PNNI routing topology of a particular node. In particular, the topology database provides all the information required to compute a route from the given source node to any destination address reachable in or through that routing domain.

When neighboring nodes at either end of a logical link begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received, its component PTSEs are examined. Each PTSE is acknowledged by encapsulating information from its PTSE header within the acknowledgment packet that is sent back to the sending neighbor.

If the PTSE is new or is more recent then the current copy in the node, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can re-originate that PTSE. PTSEs are reissued both periodically and on an event driven basis.

The database exchange process involves exchanging a sequence of database summary packets that contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes is topology database to the neighboring peer by sending database summary packets to it.

After the peer processes the database summary packets, the missing or updated PTSEs can then be requested. In the case of logical group nodes, those portions of the topology database that where originated or received at the level of the logical group node or at higher levels is included in the database summary. The PTSP and PTSE header information of each such PTSE is listed in one of the nodes database packets. PTSEs for which new instances are received after the exchanging status have been entered may not be included in any database summary packet since they will be handled by the normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the listed PTSE is not found in the topology database in the node, the particular PTSE is put on PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is then entered once the last database summary packet has been sent but the PTSE request list is not empty. At this point, the node now knows which PTSE needs to be requested. The PTSE request list contains a list of those PTSEs that need to be obtained in order to synchronize the topology database with the topology database of the neighboring peer. To request these PTSEs, the node sends the PTSE request packet which contains one or more entries from the PTSE request list. The PTSE request list packets are only sent during the Exchanging state and the Loading state. The node can send a PTSE request pack to a neighboring peer and optionally to any other neighboring peers that are also in either the Exchanging state or the Loading state and whose database summary indicates that they have the missing PTSEs.

The received PTSE request packets specify a list of PTSEs that the neighboring peer wishes to receive. For each PTSE specified in the PTSE request packet, its instance is found in its topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

A major feature of the PNNI specification is the routing algorithm used to determine a path for a call from a source user to a destination user. The routing algorithm of PNNI is a type of link state routing algorithm whereby each node is responsible for meeting its neighbors and learning their identities. Nodes learn about each other via the flooding of PTSEs described hereinabove. Each node computes routes to each destination user using the information received via the PTSEs to form a topology database representing a view of the network.

Using the Hello protocol and related FSM of PNNI neighboring nodes learn about each other by transmitting a special Hello message over the link. This is done on a continual periodic basis. When a node generates a new PTSE, the PTSE is flooded to the other nodes within its peer group. This permits each node to maintain an up to date view of the network.

Once the topology of the network is learned by all the nodes in the network, routes can be calculated from source to destination users. A routing algorithm that is commonly used to determine the optimum route from a source node to a destination node is the Dijkstra algorithm.

The Dijkstra algorithm is used to generate the Designated Transit List which is the routing list used by each node in the path during the setup phase of the call. Used in the algorithm are the topology database (link state database) which includes the PTSEs received from each node, a Path List comprising a list of nodes for which the best path from the source node has been found and a Tentative List comprising a list of nodes that are only possibly the best paths. Once it is determined that a path is in fact the best possible, the node is moved from the Tentative List to the Path List.

The algorithm begins by using the source node (self) as the root of a tree followed by the placement of the source node ID onto the Path List. Next, for each node N that is placed in the Path List, the nearest neighbors of N are examined. For each neighbor M, add the cost of the path from the root to N to the cost of the link from N to M. If M is not already in the Path List or the Tentative List with a better path cost, add M to the Tentative List.

If the Tentative List is empty, terminate the algorithm. Otherwise, find the entry in the Tentative List with the minimum cost. Move that entry to the Path List and repeat the examination step described above.

Complex Node

The ATM PNNI specification provides for a topological hierarchy that can extend up to 10 levels. The hierarchy is built from the lowest upward with the lowest level representing the physical network. A node in the lowest level represents just itself and no other nodes. Nodes in the upper levels, i.e., two through ten, are represented by what are known as logical nodes. A logical node does not exist physically but is an abstraction of a node. A logical node represents an entire peer group but at a higher level in the hierarchy.

A complex node representation is used to represent the aggregation of nodes in a peer group at the level of the logical node. The metrics, attributes and/or parameters (hereinafter referred to simply as metrics) of the links and nodes within the peer group are represented in summarized form. This permits peer groups with large numbers of nodes and links to be represented in a simple fashion.

In actuality one of the physical nodes making up a peer group is given the task of instantiating the logical group node. Normally, the physical node (located in the child peer of the logical group node to be instantiated) assigned this task is the peer group leader (PGL). Thus, the node designated the PGL is required to commit network and computing resources to run the logical group node functions, maintain one or more SVCC-based RCCs, etc. in addition to providing computing resources to run the functions of a normal physical node, i.e., routing, signaling, Hello FSM protocol, etc.

Distribution of Network Resources

In the majority of networks today, the concept of Client/Server is widely used to provide one or more services to a large number of users. In this scenario, the Server which resides on one or more computers, provides one or more services to clients which may be located anywhere in the network. In most cases, there is no synchronization between the clients and the server with regards to the order in which the connections to the server are established. Therefore, the clients are connected to the server on a first come first serve basis, i.e., the clients that come first are the first to be connected.

In an ATM network using quality of service parameters and optimization metrics/attributes the first clients to establish connections will have better optimized paths. The clients that establish connections later on will have connections that are worse in quality than those of the clients to arrive before them. Over time, no way currently exists to fairly distribute the available routes. As an example, consider delay as the optimization metric. In this case, all the initial clients will have bandwidth allocated to them while the later arriving clients will establish paths that are not as optimized and lower in quality of service. Worse still, the clients that come first, may remain connected for long lengths of time. Depending on the policy in effect for the network, this is an unfair situation whereby clients that arrive early, establish connections with more optimum quality of service then later arriving clients simply because they were there first.

SUMMARY OF THE INVENTION

The present invention is a method of distributing network resources fairly in an ATM network. The invention is applicable in situations where a large number of clients establish connections to a single server. The method solves the problem that arises when early arriving clients establish optimum connections and snatch up network resources while leaving later arriving clients with less than optimum connections. The method provides a way to more evenly distribute network resources when large numbers of clients desire connections to a popular server.

A fair percentage value is assigned to a popular server and is advertised in a PTSE. The fair percentage value is associated with a reachable ATM destination address and is flooded throughout the network. When a source node desires to connect to this server, the route is chosen in accordance with the fair percentage value. Rather than always choosing the best route, the source node chooses a route at random from among a percentage of the best routes.

For example, if the fair percentage value is 70%, then the source node chooses a route at random from the best 70% of the routes calculated. In this way, the optimum routes are distributed randomly to clients requesting connections. Now, the first come clients do not necessarily receive the best connections.

The switches can be configured with the fair percentage value either statically via a network manager or dynamically under program control. In the former case, the network manager identifies popular servers and assigns a fair percentage value by hand. In the latter case, the software tracks the call rate to attached servers/hosts and when the rate exceeds a threshold having hysteresis, a fair percentage value is assigned and advertised via PTSE flooding. The hysteresis comprises an upper and lower threshold. When the upper threshold is exceeded, advertising is initiated. When the call rate decreases below a lower threshold, advertising may cease completely or a new fair percentage value may be determined in accordance with the current call rate.

There is provided in accordance with the present invention a method of fairly distributing network resources within a network when establishing calls between a plurality of clients and a server, the method comprising the steps of identifying a server to receive fair resource distribution services when establishing calls from a plurality of clients thereto, assigning, by a destination node connected to the server, a fair percentage value to a reachable address associated with the server, advertising the address along with the fair percentage value to nodes within the network, calculating all possible routes between a source node and a destination node, the destination node corresponding to the reachable address, choosing at random one route from among the best routes calculated, wherein the number of routes used to randomly select from is equal to the fair percentage value of all possible routes and establishing the chosen route.

The network may comprise an Asynchronous Transfer Mode (ATM) network or an Internet Protocol (IP) based network. The step of advertising the address comprises placing the address in a Type, Length, Value (TLV) field within a Private Network to Network Interface (PNNI) Topology State Element (PTSE) and flooding the PTSE using standard PNNI protocol. The fair percentage value is assigned manually and configured into a switch by a network manager.

There is also provided in accordance with the present invention a method of fairly distributing network resources within a network when establishing calls between a plurality of clients and a server, the method comprising the steps of monitoring, by a destination node, the number of calls received per unit time to a particular destination address, determining if the call rate to a particular destination address is within predetermined boundaries, assigning, by a destination node connected to the server, a fair percentage value to the address whose associated call rate is within predetermined boundaries, advertising the address along with the E fair percentage value to nodes within the network, calculating all possible routes between a source node and a destination node, the destination node corresponding to the reachable address, choosing at random one route from among the best routes calculated, wherein the number of routes used to randomly select from is equal to the fair percentage value of all possible routes and establishing the chosen route.

The fair percentage value is assigned dynamically and configured into a switch without intervention by a network manager. The method further comprises the step of ceasing advertising of the address along with the fair percentage value to nodes within the network when the call rate is not within the predetermined boundaries. The method further comprises the step of redetermining the fair percentage value in accordance with the reduced call rate and advertising the address along with the redetermined fair percentage value to nodes within the network when the call rate is not within the predetermined boundaries. In addition, the predetermined boundaries comprises an upper threshold and a lower threshold whereby advertising is initiated when the call rate exceeds the upper threshold, the action of the upper threshold and the lower threshold combine to provide hysteresis.

BRIEF DESCRIPTION OF THE DRAWINGS

The invention is herein described, by way of example only, with reference to the accompanying drawings, wherein.

DETAILED DESCRIPTION OF THE INVENTION

DETAILED DESCRIPTION OF THE INVENTION
Notation Used Throughout
The following notation is used throughout this document.

| Term | Definition |
| --- | --- |
| ANSI | American National Standards Institute |
| ATM | Asynchronous Transfer Mode |
| CCITT | Comite Consulatif International Telegraphique et Telephonique |
| DS | Database Summary |
| DTL | Designated Transit List |
| FDDI | Fiber Distributed Data Interface |
| FSM | Finite State Machine |
| IISP | Interim Inter-Switch Signaling Protocol |
| ITU | International Telecommunications Union |
| LGN | Logical Group Node |
| PGL | Peer Group Leader |
| PNNI | Private Network to Network Interface |
| PTSE | PNNI Topology State Element |

-continued

DETAILED DESCRIPTION OF THE INVENTION
Notation Used Throughout
The following notation is used throughout this document.

| Term | Definition |
| --- | --- |
| PTSP | PNNI Topology State Packet |
| PVC | Permanent Virtual Circuit |
| PVP | Permanent Virtual Path |
| RCC | Routing Control Channel |
| SRCC | Switched Routing Channel Connection |
| SVC | Switched Virtual Circuit |
| SVCC | Switched Virtual Channel Connection |
| UNI | User to Network Interface |
| VCC | Virtual Channel Connection |
| VPC | Virtual Path Connection |

General Description

The present invention is a method of distributing network resources fairly in an ATM network. The invention is applicable to situations whereby a large number of clients establish connections to the same server. The method solves the problem that arises when clients that arrive first establish optimum connections while leaving later arriving clients with less than optimum connections. The method provides a way to more evenly distribute network resources when large numbers of clients desire connections to one or more popular servers. Note that for the method of the invention to operate, both the source node and destination node must support the features of the invention. Practically, however, to achieve maximum benefits from the invention, it is preferable to have as many nodes in the network support the feature.

The method of the present invention is described within the context of an ATM network for illustrative purposes only. Note, however, that the invention is not limited to ATM networks. Accordingly, one skilled in the network arts can apply the principles of the present invention to other types of networks as well. For example, the principles of the present invention are applicable to IP networks as well as ATM network, wherein large numbers of users attempt to connect to the same web server.

Figure 1:
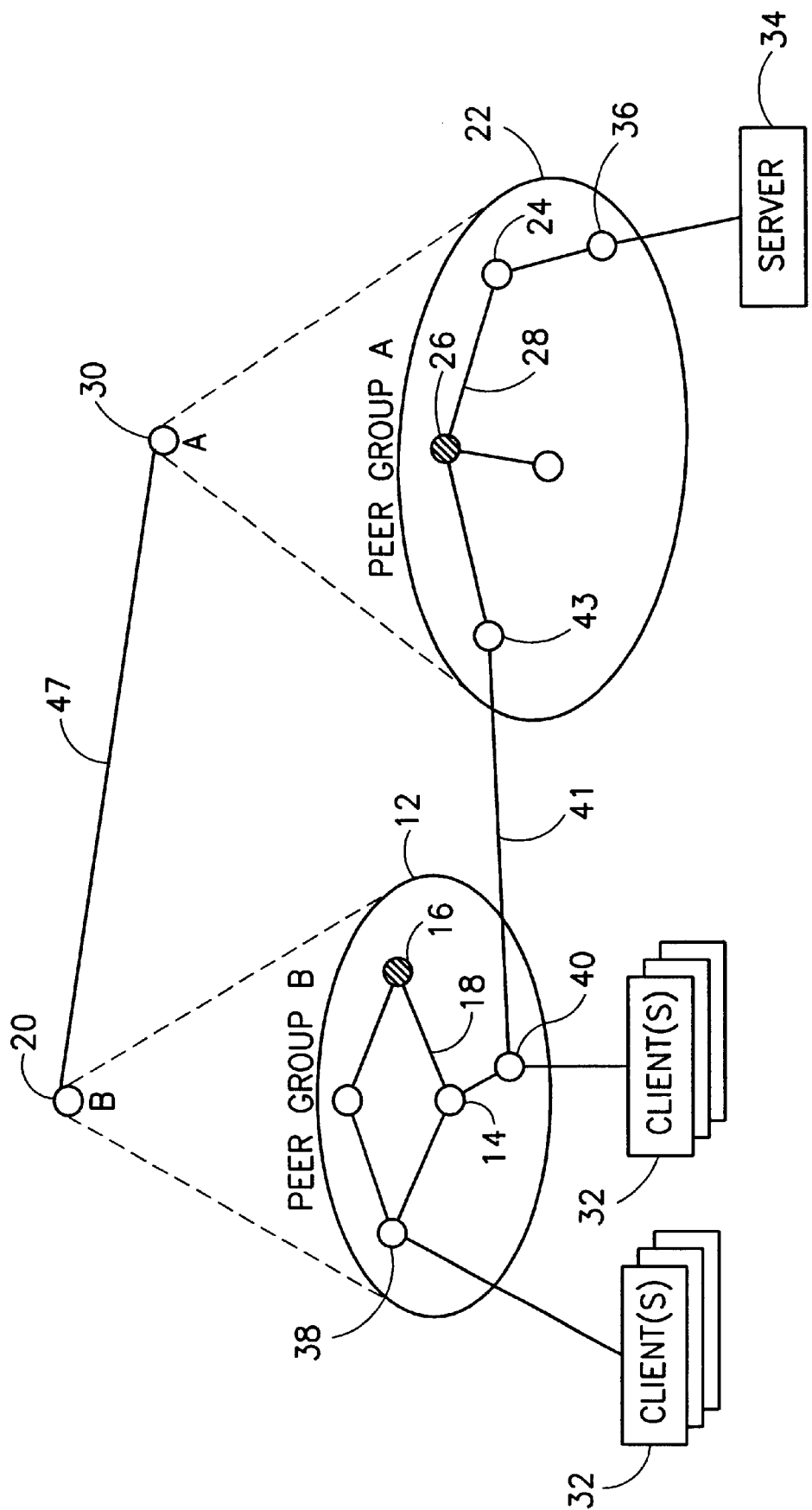
FIG. 1 is a diagram illustrating an example ATM network comprising a plurality of peer groups, two levels of hierarchy and multiple clients connected to a first server.

A diagram illustrating an example ATM network comprising a plurality of peer groups, two levels of hierarchy and multiple clients connected to a first server is shown in FIG. 1. The network, generally referenced 10, comprises two peer groups (PGs), PG A 22 and PG B 12. PG A comprises a plurality of nodes 24 connected by links 28, including a border node 43, peer group leader (PGL) 26 and a destination node 36 connected to a server 34.

PG B comprises a plurality of nodes 14 connected via links 18, including border node 40, PGL 16, source node 38 connected to a plurality of clients 32 and source node 40 connected to a plurality of clients 32. The two border nodes 40, 43 are connected via link 41. Note also that the network also comprises an upper level in the PNNI hierarchy consisting of logical node A 30 which represents peer group A, logical node B 20 which represents peer group B and a logical link 47 between them.

To illustrate the principles of the present invention, it is assumed that a large number of clients 32 desire to establish connections to the same server 34. As described above, clients that establish connections first will receive optimum network resources while clients that establish calls later on will receive less than optimum connections.

To more fairly distribute the network resource available, the invention provides a fair percentage value which is assigned to a server and advertised via standard PTSE flooding. The fair percentage value is associated with a reachable ATM destination address, i.e., the address of the server, and is flooded throughout the network. When a source node desires to connect to this server, the route is chosen in accordance with the fair percentage value. Rather than always choose the best route, the source node chooses a route at random from among a percentage of the best routes.

For example, if the fair percentage value is 70%, then the source node chooses a route at random from the best 70% of the routes calculated. In this way, the optimum routes are distributed randomly in a fair manner to clients requesting connections. Now, the client that come first do not necessarily hog the best connections.

Figure 2:
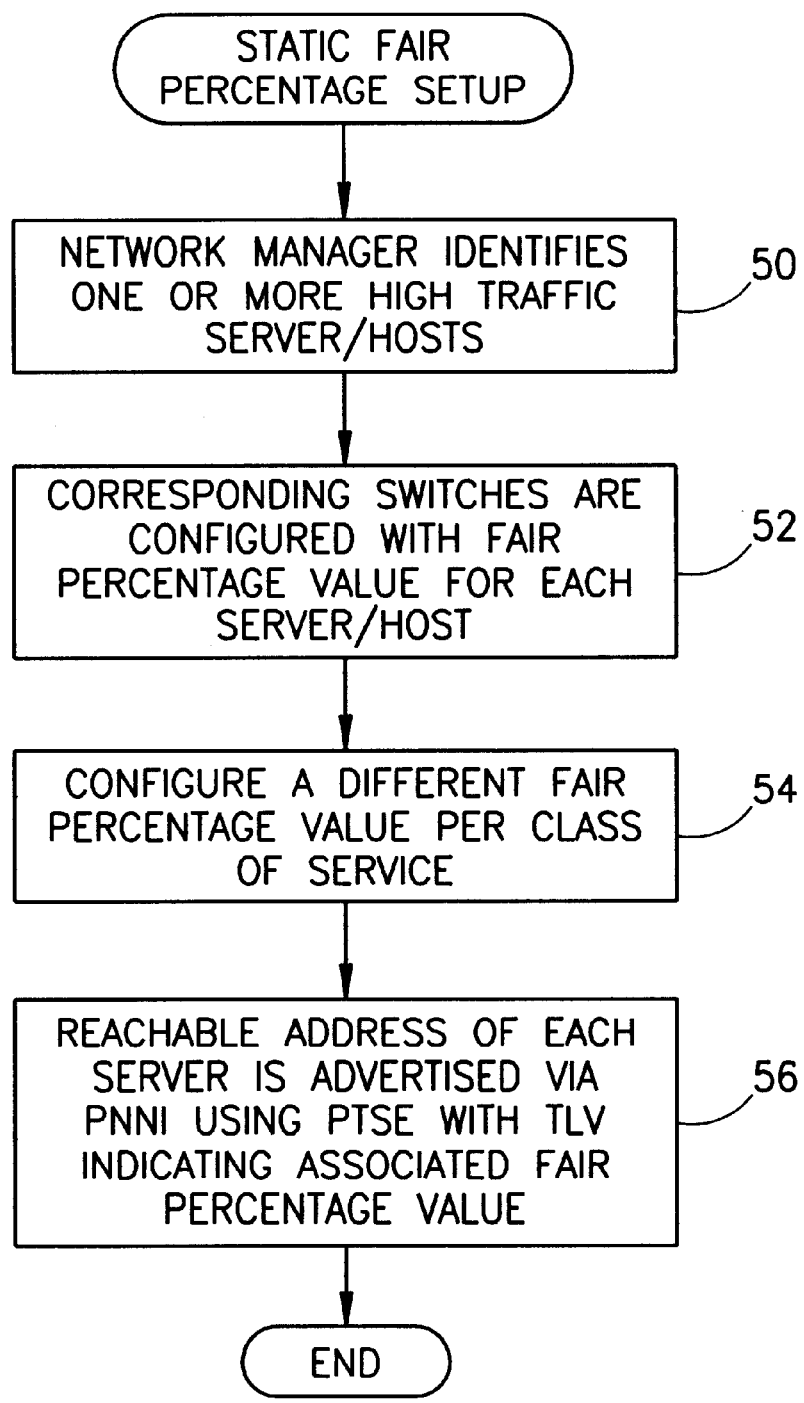
FIG. 2 is a flow diagram illustrating the static fair distribution setup method of the present invention.

The switches can be configured with the fair percentage value either statically via a network manager or dynamically under program control. The static method will now be described in more detail. A flow diagram illustrating the static fair distribution setup method of the present invention is shown in FIG. 2. In this case, the network manager first identifies popular servers that are expected to draw heavy traffic (step 50). These might include, for example, web servers or other hosts in the network. Next, the network manager chooses a value for the fair percentage to be assigned to the server. The number chosen may reflect the degree of fairness the network manager desires to inject into the route determination.

Once the fair percentage value is determined, the corresponding switch in the network is configured manually with the value (step 52). A different fair percentage value can be assigned to each server/host. The fair percentage value is a number from 0 to 100 that indicates the degree of fairness that connections to the server are to be established with.

When marked with a fair percentage value, the address PTSE of the server is advertised by the switch connected to the server when the switch participates in the PNNI routing protocol. Note that a new PTSE is generated having a new sequence number, etc. A Type, Length, Value (TLV) field containing the fair percentage value configured by the network manager is piggybacked to the address PTSE. In accordance with the invention, it is important that the address of the server not be summarized unless all the addresses with the prefix of the server have the fair percentage configured.

Note that optionally a different fair percentage value can be configured per class of service (step 54). The reachable address of each server is advertised via a PTSE with the TLV containing the fair percentage value that is flooded to the network using standard PNNI (step 56).

Once the network has knowledge of the fair percentage value associated with an address, the routing decisions made by source nodes can be performed more fairly. Any client establishing a call to that particular reachable address will not necessarily take the best route but will consider all routes up to a certain percentage as equal and will randomly choose one of these routes.

Figure 3:
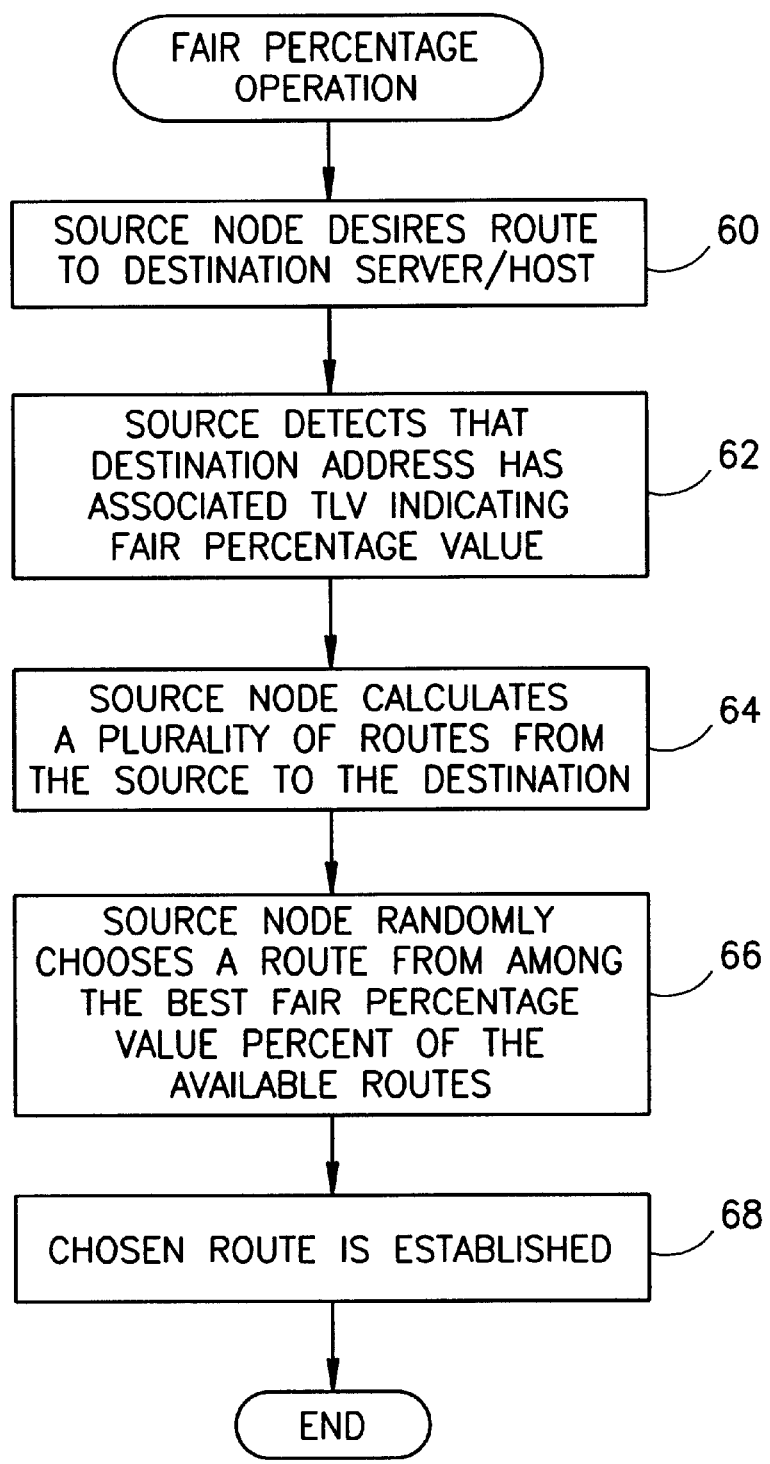
FIG. 3 is a flow diagram illustrating the operation of the fair distribution method of the present invention.

A flow diagram illustrating the operation of the fair distribution method of the present invention is shown in FIG. 3. Initially, a call setup request is generated by an end station and received by a source node, node 38 (FIG. 1), for example (step 60). The source node detects that the destination address has a TLV indicating a fair percentage value associated therewith (step 62). The source node then calculates a plurality of routes from the source to the destination using standard route calculation techniques (step 64). The source then randomly chooses a route from among a group of routes selected from the route just calculated (step 66). The group of routes contains a percentage of the total routes calculated. The routes are ordered in order of quality of service, i.e., from most optimum to least optimum. A number of routes corresponding to the best fair percentage of the optimum routes are selected and placed in the group. The percentage corresponding to the fair percentage value associated with the destination address. The chosen route is then established (step 68).

As an example, consider a fair percentage value of 80% previously assigned to an address corresponding to a popular server. When calculating a route, the source node randomly selects a route from the best 80% of the routes calculated. Assuming there are 50 routes calculated, a route is chosen randomly from the best 40 routes. The route chosen is the route established to the destination. Note that in the extreme cases, a fair percentage value of 0% indicates to the node to choose the best path (as if the fair distribution was not operative) and a fair percentage value 100% indicates to randomly choose between all possible paths calculated by the source node.

Figure 4:
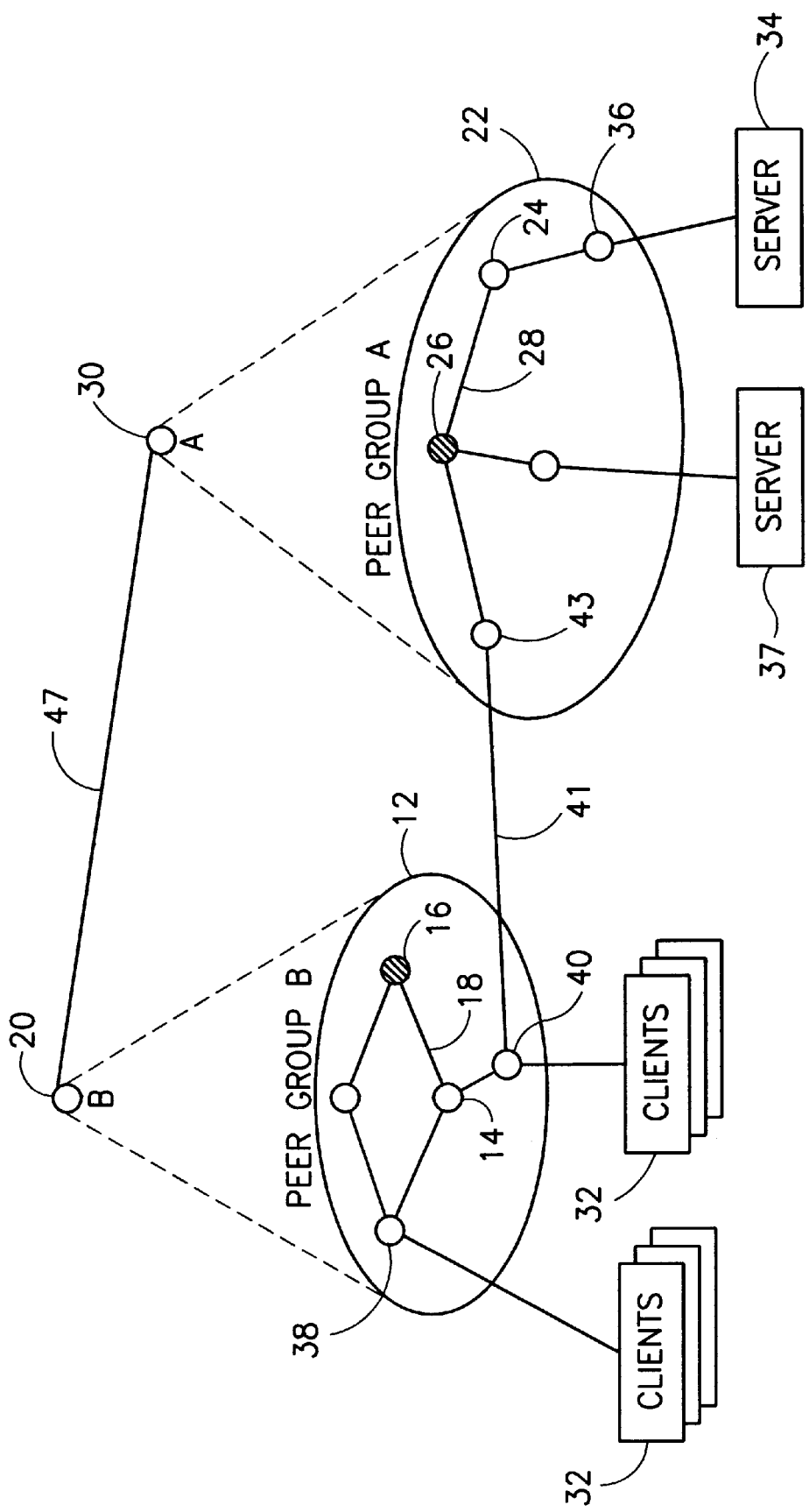
FIG. 4 is a diagram illustrating the example ATM network of FIG. 1 comprising a plurality of peer groups, two levels of hierarchy and multiple clients connected to a second server.

The method of the present invention provides for dynamic allocation of the fair percentage value in addition to the static allocation described hereinabove. The dynamic allocation method is described in the context of an example ATM network illustrated in FIG. 4, showing a plurality of peer groups, two levels of hierarchy and multiple clients connected to a second server. The network 10 comprises the same components as that of FIG. 1 with the addition of a second server 37 connected to a destination node 33.

The switch 33 that the server 37 is connected to is adapted to perform the method of the present invention. In accordance with the dynamic setup method of the present invention, the switch 33 is configured without intervention by a network manager with a fair percentage value on a dynamic basis. This embodiment is useful when it is not known a priori which server or host will be popular.

Figure 5:
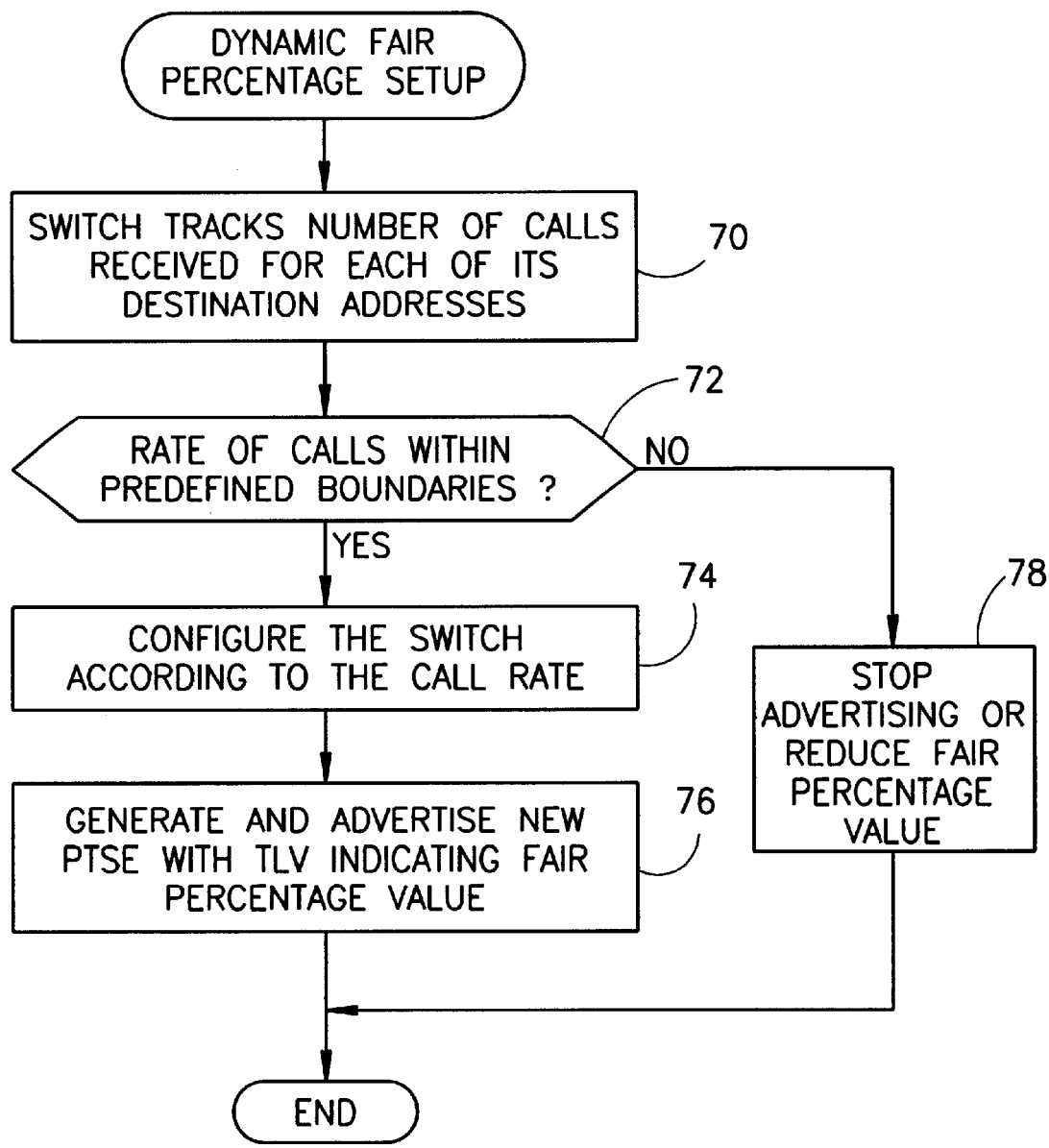
FIG. 5 is a flow diagram illustrating the dynamic fair distribution setup method of the present invention.

A flow diagram illustrating the dynamic fair distribution setup method of the present invention is shown in FIG. 5. In each switch that supports the features of the present invention, the number of calls received to an address is tracked for each destination address associated with the switch (step 70). The call rate is used as an indication of the popularity of a server. Note that it is assumed that the address on that particular port is associated with a server is very popular. While monitoring the call rate for each destination address, the switch is adapted to detect when the rate of calls for any address is within predetermined boundaries (step 72). The boundaries comprise, for example, two thresholds that are skewed so as to provide hysteresis to prevent oscillations. The threshold used to begin advertising being higher in value than that used to end advertising. A typical upper threshold to begin advertising, for example, may be 12 calls/sec while the lower threshold may be 8 calls/sec which, when crossed, causes advertising to cease. Both upper and lower thresholds are configurable by the network manager to permit variable degrees of hysteresis. Note also that call tracking is only performed for addresses wherein the node acts as a terminating node.

In IP networks, this is analogous to using a Domain Name Server (DNS) in an IP network. The DNS tracks the number of hits for a particular addresses. A fair percentage value is assigned for address that exceed a predetermined threshold.

If the call rate drops below the lower threshold, the switch ceases advertising the TLV along with the address (step 78). This occurs when a previously popular server loses its popularity. When this occurs, the call rate decreases. When the call rate crosses the lower hysteresis threshold, advertises is ceased for that TLV. An alternative to ceasing advertising all together is to advertise with an adjusted fair percentage value. In this case, then the call rate pass the lower threshold, a new fair percentage value is calculated in accordance with the call rate and a new PTSE with the corresponding TLV is advertised.

Once the call rate threshold is within a predetermined boundary for an address, the switch then assigns a fair percentage value to the address in accordance with the magnitude of the call rate (step 74). Note that alternatively, a single fair percentage value may be assigned for all call rates rather than assigning different values depending on the magnitude of the call rate. For example, if the upper threshold is set to 10 calls/sec, a call rate of 0 to 10 calls/sec does not cause a fair percentage value to be assigned. A call rate of 11 to 20 calls/sec causes a fair percentage value of 90% to be assigned; 21 to 50 calls/sec corresponds to a fair percentage value of 80% and 51 and upward calls/sec corresponds to a fair percentage value of 50%.

Once the fair percentage value is determined, a PTSE with an attached TLV containing the fair percentage value is generated and advertised via standard PNNI flooding (step 76). Once the PTSE is flooded, the switches that support the feature of the invention will use the fair percentage value when choosing a route from among the available routes calculated as described in the flow diagram of FIG. 3.

Note that in accordance with this dynamic method, the calls established to the server before the threshold was exceeded will be optimized. In other words, all calls established before the threshold is exceeded will be the best available routes. Calls established from that point on, however, will fairly distribute the remaining resources. Note that this does not occur with the static method described hereinabove. With the dynamic method, however, no intervention by the network manager is required.

Note that as an alternative, elements from both the static setup method and the dynamic setup method may be combined. For example, some addresses may be assigned fair percentage values manually while others are assigned value dynamically.

While the invention has been described with respect to a limited number of embodiments, it will be appreciated that many variations, modifications and other applications of the invention may be made.

What is claimed is:

1. A method of fairly distributing network resources within a network when establishing calls between a plurality of clients and a server, said method comprising the steps of:

identifying a server to receive fair resource distribution services when establishing calls from a plurality of clients thereto;

assigning, by a destination node connected to said server, a fair percentage value to a reachable address associated with said server;

advertising said address along with said fair percentage value to nodes within said network;

calculating all possible routes between a source node and a destination node, said destination node corresponding to said reachable address;

choosing at random one route from among the best routes calculated, wherein the number of routes used to randomly select from is equal to said fair percentage value of all possible routes; and establishing said chosen route.

2. The method according to claim 1, wherein said network comprises an Asynchronous Transfer Mode (ATM) network.

3. The method according to claim 1, wherein said network comprises an Internet Protocol (IP) based network.

4. The method according to claim 1, wherein said step of advertising said address comprises placing said address in a Type, Length, Value (TLV) field within a Private Network to Network Interface (PNNI) Topology State Element (PTSE) and flooding said PTSE using standard PNNI protocol.

5. The method according to claim 1, wherein said fair percentage value is assigned manually and configured into a switch by a network manager.

6. A method of fairly distributing network resources within a network when establishing calls between a plurality of clients and a server, said method comprising the steps of:

monitoring, by a destination node, the number of calls received per unit time to a particular destination address;

determining if the call rate to a particular destination address is within predetermined boundaries;

assigning, by a destination node connected to said server, a fair percentage value to the address whose associated call rate is within predetermined boundaries;

advertising said address along with said fair percentage value to nodes within said network;

calculating all possible routes between a source node and a destination node, said destination node corresponding to said reachable address;

choosing at random one route from among the best routes calculated, wherein the number of routes used to randomly select from is equal to said fair percentage value of all possible routes; and establishing said chosen route.

7. The method according to claim 6, wherein said network comprises an Asynchronous Transfer Mode (ATM) network.

8. The method according to claim 6, wherein said network comprises an Internet Protocol (IP) based network.

9. The method according to claim 6, wherein said step of advertising said address comprises placing said address in a Type, Length, Value (TLV) field within a Private Network to Network Interface (PNNI) Topology State Element (PTSE) and flooding said PTSE using standard PNNI protocol.

10. The method according to claim 6, wherein said fair percentage value is assigned to said address in accordance with the magnitude of said call rate.

11. The method according to claim 6, wherein said fair percentage value is assigned dynamically and configured into a switch without intervention by a network manager.

12. The method according to claim 6, further comprising the step of ceasing advertising of said address along with said fair percentage value to nodes within said network when said call rate is not within said predetermined boundaries.

13. The method according to claim 6, further comprising the step of redetermining said fair percentage value in accordance with the reduced call rate and advertising said address along with said redetermined fair percentage value to nodes within said network when said call rate is not within said predetermined boundaries.

14. The method according to claim 6, wherein said predetermined boundaries comprises an upper threshold and a lower threshold whereby advertising is initiated when said call rate exceeds said upper threshold, the action of said upper threshold and said lower threshold combine to provide hysteresis.

* * * * *